United States Patent [19]

Yanagisawa et al.

[11] 4,251,791
[45] Feb. 17, 1981

[54] MAGNETIC BASE

[75] Inventors: Kiyoshi Yanagisawa; Mamoru Uchikune; Mutsukazu Tagami, all of Ueda; Taketo Shimizu, Nagano; Kunio Horiuchi; Hiroo Sakaguchi, both of Ueda, all of Japan

[73] Assignee: Kanetsu Kogyo Kabushiki Kaisha, Ueda, Japan

[21] Appl. No.: 64,991

[22] Filed: Aug. 9, 1979

[30] Foreign Application Priority Data

Dec. 8, 1978 [JP] Japan ................. 53-150993

[51] Int. Cl.$^3$ ............................................. H01F 7/02
[52] U.S. Cl. ................. 335/302; 335/285; 335/295
[58] Field of Search ............ 335/302, 303, 306, 295, 335/285

[56] References Cited

U.S. PATENT DOCUMENTS

| 3,184,654 | 5/1965 | Bey | 335/295 |
| 3,452,310 | 6/1969 | Israelson | 335/295 X |
| 3,677,947 | 7/1972 | Ray et al. | 335/302 X |
| 4,055,824 | 10/1977 | Baermann | 335/295 |

FOREIGN PATENT DOCUMENTS

| 1195881 | 7/1963 | Fed. Rep. of Germany | 335/295 |
| 18-2498 | of 1943 | Japan | 335/285 |

Primary Examiner—George Harris
Attorney, Agent, or Firm—Graybeal & Uhlir

[57] ABSTRACT

A magnetic base adapted to be secured to a magnetic substance attractively, wherein a permanent magnet 20 having a small reversible permeability $\mu$ is employed as a rotary magnet housed in a magnetic block 18 and rotated for switching magnetic active surfaces 24 of the block from an unexcited state to an excited state, thereby effecting a light and smooth rotation.

6 Claims, 4 Drawing Figures

MAGNETIC BASE

BACKGROUND OF THE INVENTION

1. Field of the Invention

The present invention relates to a magnetic base adapted to be used, for example, for supporting a measuring instrument such as a strain gauge by a post and/or arm provided on the magnetic base which in turn is secured by a magnetic force to a magnetic substance and more particularly to a magnetic base which is switchable to be engaged or released from such a substance by an operation of rotating a permanent magnet disposed rotatably in a magnetic circuit block.

2. Description of the Prior Art

In the conventional magnetic base of this type known heretofore, the magnetic active surface of a magnetic circuit block may be placed into an excited state or an unexcited state by rotating a permanent magnet housed rotatably in a cavity formed in the block.

For the permanent magnet incorporated in such a magnetic base, it has been customary to use an alnico magnet having a large residual magnetic flux density. However, in the conventional base equipped with an alnico magnet, a great rotatory resistance resulting from a magnetic force is exerted at a given angle during the rotation of the magnet from an unexcited state to an excited state, hence causing difficulty in achieving a light and smooth switching operation.

SUMMARY OF THE INVENTION

It is an object of the present invention, therefore, to provide an improved magnetic base which is capable of effecting light and smooth switchover from an unexcited state to an excited state.

The present invention has been accomplished on the basis of the fact that the alnico magnet, when subjected during its rotation to a great rotatory resistance caused by a magnetic force, presents a large reversible permeability and also that such rotary resistance is dependent on the reversible permeability of the magnet. Thus the feature of the invention resides in employing a magnet of a small reversible permeability as the permanent magnet disposed rotatably in the cavity of a magnetic circuit block.

Consequently, according to this invention, the magnet is kept free from receiving a great rotatory resistance at a given angle during the rotation, hence realizing light and smooth switchover from an unexcited state to an excited state.

DESCRIPTION OF THE PREFERRED EMBODIMENTS

Figure 1:
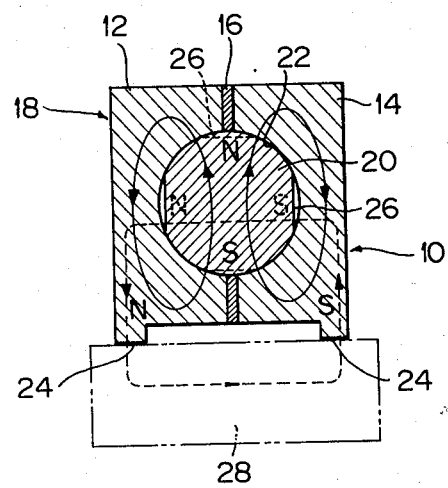
FIG. 1 is a cross-sectional view of a magnetic base according to the present invention.
Figure 2:
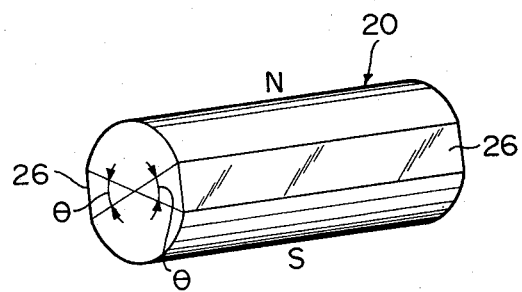
FIG. 2 is a perspective view of a rotary magnet shown in FIG. 1.

In FIG. 1, there is shown a magnetic base of the present invention, generally indicated at 10. The base 10 comprises a magnetic circuit block 18 constituted of magnetic members 12 and 14 between which a plate-shaped nonmagnetic member 16 is interposed and joined integrally. In the magnetic circuit block, a cavity 22 having a circular cross section is formed to accept a columnar permanent magnet 20 as shown in FIG. 2 rotatably, and a pair of magnetic active surfaces 24 are formed on the bottom of the block 18. A post and an arm (not shown) for holding a measuring instrument such as a strain gauge are provided on the block 18, in similar fashion to a conventional magnetic base.

The columnar permanent magnet 20 housed rotatably in the cavity 22 has a substantially circular cross section defined by a circle of a radius slightly smaller than the radius of the cavity 22, and magnetic poles of different polarities (N and S) are formed opposite to each other in the diametral direction. And the two sides of the magnet 20 are chamfered to define flat faces 26 with a small angular range $\theta$ of, for example, about 48 degrees individually. By the operation of a knob (not shown) similar to the one used in a conventional base, the magnet 20 may be rotated in the cavity 22 around its longitudinal center axis which is in alignment with the center axis of the cavity 22.

Contrary to an alnico magnet of a large reverse permeability employed in the conventional base, the rotary magnet 20 according to the present invention is composed of a material having a small reversible permeability. Some examples of magnetic materials having a small reversible permeability are ferrite, Ba-ferrite, Sr-ferrite and rare-earth metal.

Figure 3:
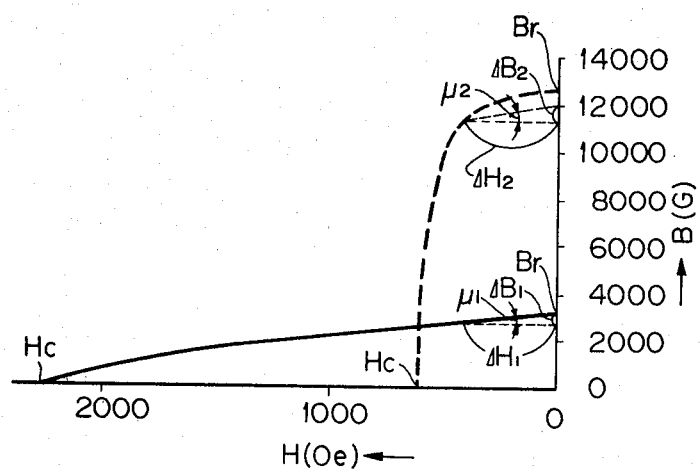
FIG. 3 is a graph representing the demagnetizing characteristic of a ferrite magnet according to the invention.

FIG. 3 is a graphic representation showing a comparison between typical demagnetizing characteristic of a ferrite magnet and that of an alnico magnet, in which the ordinate denotes a magnetic flux density B (gauss) and the abscissa denotes a magnetic field intensity H (oersted). The characteristic of the ferrite magnet is shown by a solid line, while that of the alnico magnet by a broken line. In designing a dynamic magnetic circuit, generally its working point is set to be slightly beyond the inflection point of the characteristic curve toward the higher side of the magnetic flux density. And with respect to the reversible permeability $\mu$ ($=\Delta B/\Delta H$) represented by the inclination of a minor loop from the working point, the reversible permeability $\mu 1$ ($=\Delta B1/\Delta H1$) of the ferrite magnet is smaller than the reversible permeability $\mu 2$ ($=\Delta B2/\Delta H2$) of the alnico magnet.

The residual flux density (Br) of the alnico magnet ranges from 10,000 to 13,000 gauss, and its coercive force (Hc) ranges from 500 to 700 oersteds. Although the residual flux density and the coercive force differ with various types of alnico magnets, each demagnetizing characteristic curve is substantially the same as the broken line shown in the graph of FIG. 3, and the reversible permeability $\mu 2$ of the alnico magnet ranges from 2.5 to 4.0 electromagnetic units (emu). In comparison with the above, a residual flux density (Br) and a coercive force (Hc) of the ferrite magnet range from 2,000 to 4,000 gauss and from 1,600 to 2,700 oersteds, respectively. Although these values differ with various types of ferrite magnets, each demagnetizing characteristic curve is substantially the same as the solid line shown in FIG. 3. The reversible permeability $\mu 1$ of the ferrite magnet is in a range of 1.05 to 1.15 emu which is smaller than that of the alnico magnet. The rare-earth metal magnet presents characteristic similar to that of the ferrite magnet, and its reversible permeability ranges also from 1.05 to 1.15 emu.

In the base 10 of this invention which is equipped with the rotary magnet 20 composed of a material of a small reversible permeability, the magnetic flux of the magnet 20 is enclosed, as indicated by solid line arrows in FIG. 1, within the magnetic members 12 and 14 at rotational position where the two poles (N and S) shown by solid lines are located along the nonmagnetic member 16, so that the magnetic active surfaces 24 are placed into an unexcited state. When the knob is actuated to rotate the magnet 20 by 90 degrees as shown by the broken line in FIG. 1, the magnetic flux of the magnet 20 passes through the magnetic active surfaces 24 as indicated by a broken line arrow, thereby placing the surfaces 24 into an excited state to be engaged the ferro magnetic member 28.

Figure 4:
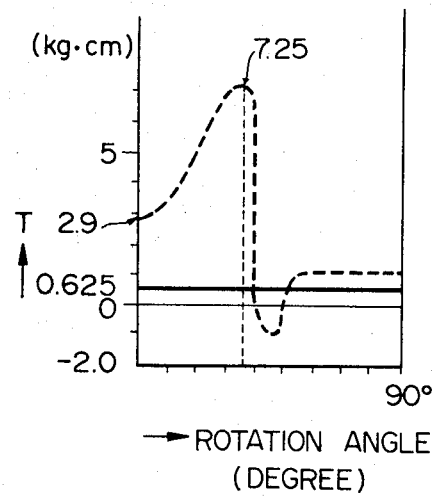
FIG. 4 is a graph representing the torque characteristic of the magnetic base of FIG. 1 observed at the switchover thereof.

FIG. 4 graphically represents the relationship between the operational rotation angle of the magnet 20 and the rotatory resistance exerted onto the magnet 20 by the magnetic force thereof during rotation from an unexcited state to an excited state. The abscissa denotes a rotation angle (degree) from the unexcited position to the excited position, and the ordinate denotes a torque (Kg.cm). The broken line in the graph represents the conventional torque characteristic observed in a known alnico magnet of a large reversible permeability used as the rotary magnet, while the solid line represents the torque characteristic of this invention. As is apparent from this graph, the alnico magnet of a large reversible permeability is subjected to a large resistance of 7.24 Kg.cm rising suddenly in the the vicinity of a rotation angle of 35 degrees, and this resistance decreases sharply with a slight increase of the rotation angle. Therefore, in the conventional base, the magnet rotated through 90 degrees for switching from the unexcited state to the excited state receives a great resistance momentarily at a given angle, and the resistance rebounds in the form of impact against an operator. To the contrary, according to the present invention employing a rotary magnet of a small reversible permeability, merely a small fixed rotatory resistance of 0.625 Kg.cm is exerted during the rotation to execute said switching action, hence enabling the operator to perform light and smooth switchover by a small fixed actuating force.

Depending on the chamfering degree at the two sides of the rotary magnet 20, there occurs a slight change in the torque characteristic of the magnet. However, it never brings about such a sharp torque variation that appears in the conventional alnico magnet, thereby preventing impairment of light and smooth operational feeling.

As will be clear from the aforementioned, the magnet of a small reversible permeability indicates a smaller residual flux density than that of the alnico magnet while indicating a larger coercive force to the contrary, so that in designing a dynamic magnetic circuit, the magnet of a small reversible permeability requires a permeance far smaller than that of the alnico magnet. In the meanwhile, the alnico magnet requires a large permeance in designing the magnetic circuit for exertion of a restorable great magnetic attraction onto the magnetic active surfaces by repeating the rotation within the magnetic circuit block, hence a large space is needed between the magnet and the magnetic circuit block. Consequently, the use of a columnar magnet equivalent dimensionally to the internal cavity of the magnetic circuit block is rendered impossible in the case of a known alnico magnet, and therefore it has been necessary to chamfer the two sides of the columnar magnet in a wide angular range.

However, in the magnet 20 of the present invention having a large coercive force, setting of a small permeance is permitted. Thus, it becomes possible in the present invention to employ a columnar magnet 20 conforming to the entirety of the cavity 22 in the magnetic circuit block 18 as already mentioned, and moreover such a columnar magnet may be disposed even without said chamfering in the cavity 22. As a result, the dimensional capacity of the magnet 20 in the cavity 22 is increasable to achieve sufficient compensation for a reduction in the residual flux density, thereby allowing an ample attracting force to be exerted onto the magnetic active surfaces 24 as in the conventional device.

As described hereinabove, the present invention is capable of preventing occurrence of a strong impact during switchover from an unexcited state to an excited state, hence ensuring a light and smooth switching action.

We claim:

1. In a magnetic base including an elongate magnetic circuit block consisting of a pair of magnetic members each having a magnetically active surface, a nonmagnetic member interposed between the two magnetic members, with portions of said block defining an elongate generally cylindrical cavity extending longitudinally through said block, wherein the improvement comprises an improved elongate, generally cylindrical permanent magnet disposed in the cavity of the magnetic circuit block to rotate around its longitudinal axis and in alignment with the longitudinal axis of the cavity so as to place the magnetically active surfaces into an excited state or an unexcited state, said permanent magnet being composed substantially entirely of a material having a small reversible permeability, and said permanent magnet occupying substantially the entire volume of the cavity of the magnetic circuit block.

2. The improvement as set forth in claim 1, wherein the reversible permeability of said permanent magnet ranges from 1.05 to 1.15 emu.

3. The improvement as set forth in claim 1, wherein said permanent magnet is composed of ferrite.

4. The improvement as set forth in claim 1, wherein said permanent magnet is composed of a rare-earth metal.

5. The improvement as set forth in claim 1, wherein said permanent magnet is shaped to be columnar with magnetic poles of different polarities opposed to each other in the diametral direction, and has flat faces on the two sides thereof.

6. The improvement as set forth in claim 1, wherein said permanent magnet consists essentially of a magnetic material selected from the group consisting of ferrite, Ba-ferrite, Sr-ferrite, and rare-earth metal.

* * * * *